May 1, 1934.   G. HUHN   1,956,900
CARBON RING PACKING FOR THE SHAFTS OF TURBINES AND THE LIKE
Filed Feb. 17, 1933   2 Sheets-Sheet 1
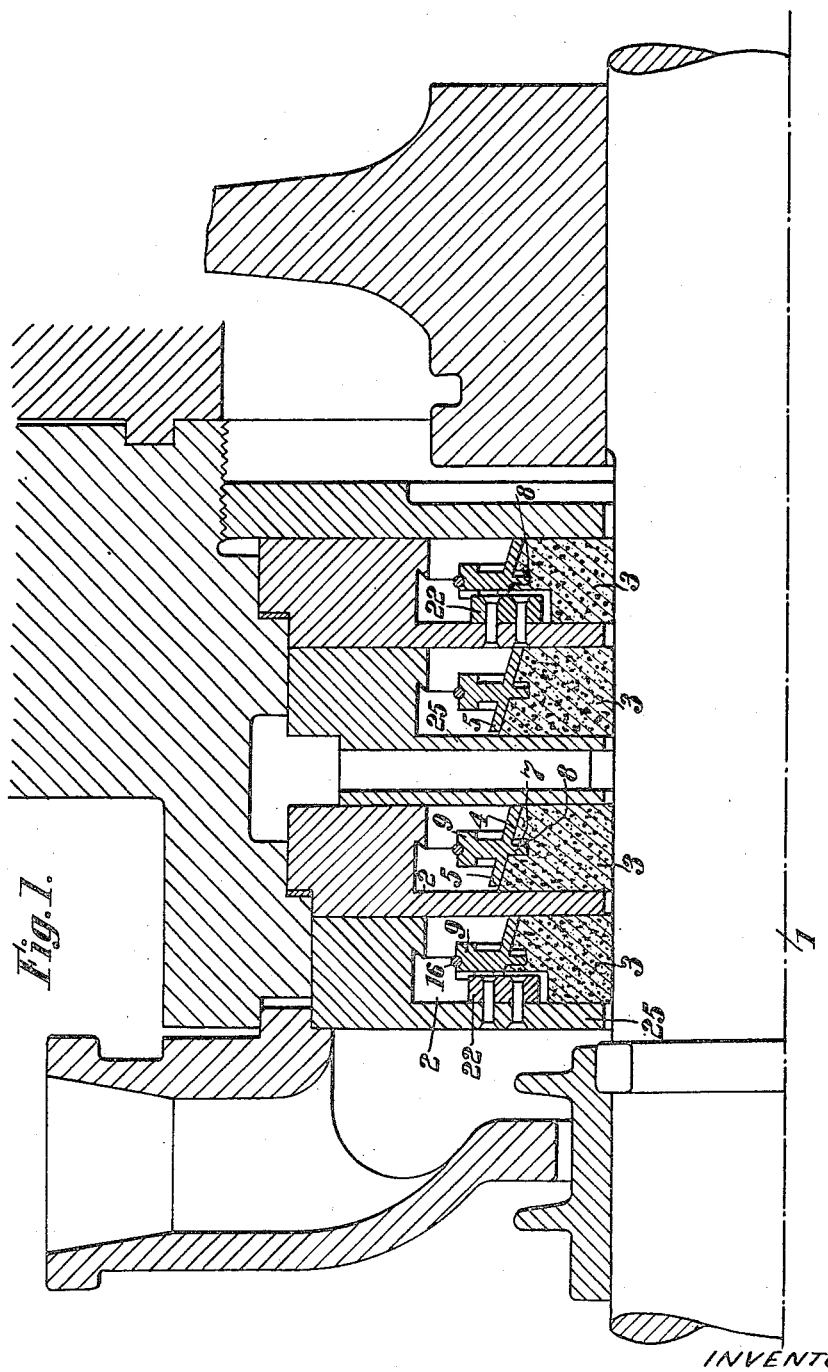
INVENTOR
Gustav Huhn
BY
ATTORNEYS May 1, 1934.    G. HUHN    1,956,900
CARBON RING PACKING FOR THE SHAFTS OF TURBINES AND THE LIKE
Filed Feb. 17, 1933    2 Sheets-Sheet 2
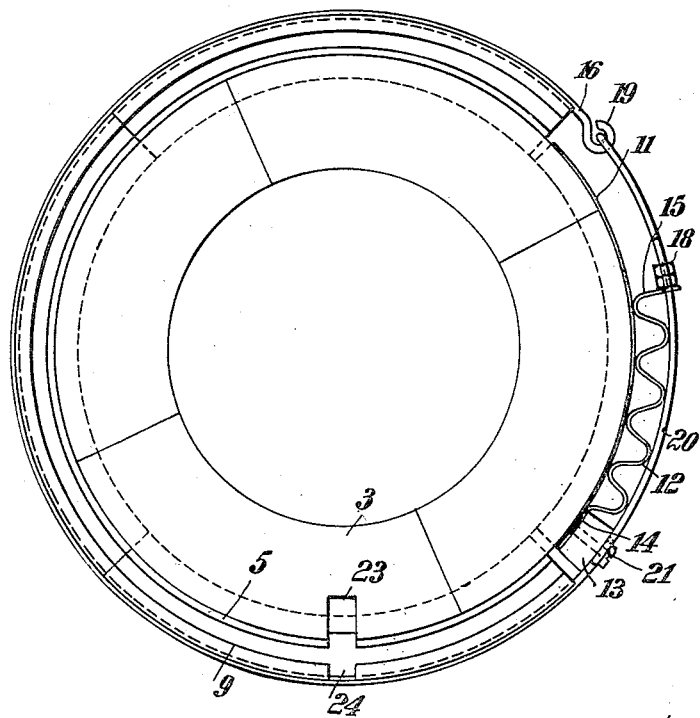
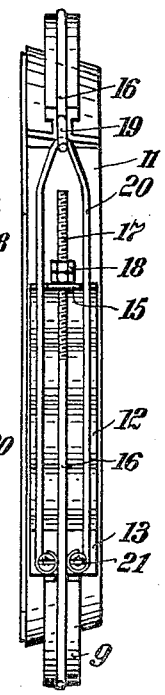
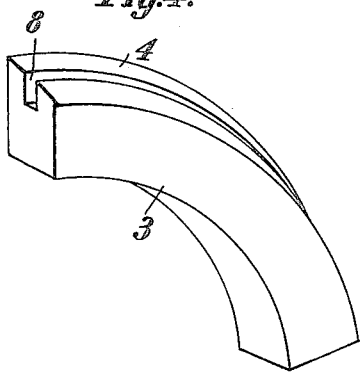
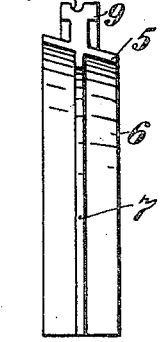
INVENTOR
Gustav Huhn
BY H. B. Willson & Co.
ATTORNEYS Patented May 1, 1934

1,956,900

UNITED STATES PATENT OFFICE 1,956,900

CARBON RING PACKING FOR THE SHAFTS OF TURBINES AND THE LIKE

Gustav Huhn, Berlin, Germany

Application February 17, 1933, Serial No. 657,299
In Germany March 30, 1932

4 Claims. (Cl. 286—24)

In the packings in accordance with the British Patent 21,132 of 1910 it is of importance that the packing rings are pressed under the action of circumferential springs by means of wedge effect against the two lateral walls of the packing chamber, in order to thus relieve the shaft of the thrust of the rings and to prevent as much as possible the wear of the rings on their internal surface turned towards the shaft. These known packings require the employment of a couple of packing rings in each of the separate chambers. This, however, necessitates the packing space to be of considerable width, particularly if packing rings of carbon or graphite are concerned, as at present is ordinarily the case, each single one of the rings being of considerable width or thickness in order to possess a sufficient degree of strength.

The object of the present invention consists of a carbon ring packing for the shafts of turbines and the like, each carbon ring also being pressed against a lateral wall of the packing chamber under wedge action. In this case, however, each packing unit only consists of one single carbon packing ring with an oblique outer ring surface, a thrust collar with a correspondingly oblique inner surface encasing said outer ring surface of the carbon ring, and a spring enclosing said collar, the collar being made of any desired appropriate material. Consequently the packing rings here are pressed only against one of the lateral walls of the packing chamber by means of the spring pressure transmitted through the medium of the key ring or thrust collar. This pressing is preferably exerted against that lateral wall of the packing chamber which is next the side of the minor pressure of the medium against which the packing shall tighten (steam or the like). It has been ascertained, that this form of packing suffices, on the one hand, to attain absolute tightness and to effect, on the other hand, that when cutting off the pressure medium, such as steam or the like, the packing ring will remain in its position at the corresponding lateral wall of the packing chamber, thus being prevented from weighing upon the shaft and from being worn out on its inner surface. This construction of the packing also renders it possible to considerably reduce the packing space otherwise required and, in consequence thereof, to simultaneously reduce the dimensions of the turbine or the like, or else to accommodate a correspondingly larger number of packing chambers and packing rings within a given space, as this is essential in machines with the maximum pressures frequently usual at present.

An advantageous feature embodied in the known key ring packings, in accordance with the British patent above referred to, consists in their convenient kind of mounting, because the segments of the divided packing ring in these cases showed but little tendency to slip away laterally under the pressure of the surrounding spring. In order to be able to retain this advantageous feature in the packing according to the present invention, it is preferable to provide the thrust collar on the oblique inner face with projections adapted to engage corresponding depressions on the outer face of the divided carbon packing ring, and to thus prevent a lateral slipping out of the parts of the latter. The arrangement for this purpose may be such that an annular rib is provided on the inner face of the thrust collar, said rib engaging an annular groove in the outer face of the carbon packing ring, but in such a manner that it has a little play.

One embodiment of the present invention has been illustrated in the accompanying drawings, in which:

Fig. 1 represents a sectional view of one half of the packing space of a shaft;

Fig. 2 is a front view, separately, of one of the packing units to be employed,

Fig. 3 is a corresponding side view of this packing unit.

Fig. 4 is a perspective view of one of the segments of the carbon packing ring, separately, and Fig. 5 is a side view of one of the segments of the thrust collar, separately.

In each of the chambers 2, which serve for packing the shaft 1, a divided carbon or graphite ring 3 has been disposed as packing ring. The outer face 4 of each of these rings has been made to taper towards one side.

Each of the carbon rings 3 is circumfered by a thrust collar 5, preferably also divided, and provided with an oblique or tapered inner surface 6 corresponding to the oblique surface 4. The divided thrust collar 5 preferably is made of a suitable metal or metal alloy, such as copper, brass or the like. As this thrust collar has not to exercise a tightening effect directly, it may be made comparatively thin. Its width is, as may be seen from Fig. 1, somewhat less than the inside or free width of each of the chambers 2.

Each of the divided thrust collars 5 is provided on its inner face with an annular rib 7 which is made to engage with an annular groove 8 on the outer face 4 of the divided packing ring 3. As will be seen from Fig. 1, the annular groove 8 is somewhat wider than the annular rib 7, so that the latter will have play in the annular groove 8.

In the middle line of the outside of the thrust collar 5 a projection 9 is arranged, being provided with a bearing 10 for a pressure spring. This projection 9 could, of course, also be omitted, in which case the bearing for the pressure spring could also be provided in the thrust collar 5 proper, which, for this purpose could be made of somewhat greater thickness. The disposition of the annular projection 9 principally serves for the purpose of reducing the weight of the thrust collar to the furtherest possible extent.

In the embodiment of invention shown the pressure spring consists of a wave spring 12 in accordance to that described in British Patent 228,801, of 1925, said wave spring cooperating with a non-elastic wire or band 16. In the present case that segment 11 (Fig. 2) of the thrust collar 5, on which the wave spring 12 is seated, has no projection. At one end of this segment 11 a block 13 is secured, said block serving for clamping the one end 14 of the wave spring 12. Through a hole in the bent-up other end 15 of this wave spring 12 one end of the wire 16 has been made to pass, being provided with a thread 17 (see Fig. 3). The wire 16 then passes through the grooves 10 of the projections 9 of the other segments of the thrust collar 5 and thus surrounds the latter.—The other end 19 of the wire 16 forms an eyelet in which a double-branched wire 20 bent back in itself, has been engaged. The two branches or shanks of this wire 20 are arranged parallel to the first end of the wire 16, provided with the thread 17, which thus lies in the midst between them, and pass over the wave spring 12, their ends being secured to the block 13 by screws 21. By this kind of construction and arrangement of the wire for the wave spring a centric position of this wire will be obtained and consequently an absolutely uniform exertion of the pressure by the wire on the wave spring. The threaded end 17 of the wire 16 is detachably and adjustably connected with the wave spring 12 by means of the nuts 18.

For the purpose of preventing a circular displacement of the packing units within the interior of the chambers 2 (Fig. 1), a block 22 is secured in each of these chambers which serves as a stop, whereas the packing ring 3 and the thrust collar 6 are provided with corresponding gaps 23 and 24 (Fig. 2) which are engaged by the block 22.

It will be seen from Fig. 1, that each of the carbon packing rings 3 is forced by the thrust collar 5 encircling it, under the action of the wave spring 12 and wire 16, against the side wall 25 of the corresponding chamber 2, i. e. against that wall which is next the side of the lesser pressure of the pressure medium, as, for instance, the steam of the turbine. If the steam or the like is admitted, it is obvious that its pressure will press the packing unit in the first chamber against the same side wall with correspondingly greater force, thereby preventing the pressure medium to penetrate into the second chamber, and so on. When stopping the admission of the steam or other pressure medium, however, the packing ring 3 will remain pressed on the said side wall of the packing chamber in consequence of the action of the wedge pressure exerted by the spring and the thrust collar, and in this way the wearing out of the packing ring 3 by the shaft 1 will also under these circumstances be prevented.

It is a matter of course that the object of the present invention is applicable not only to the shafts of turbines, but also to other kinds of shafts.

The width of the packing rings is, as already mentioned previously, essentially dependent upon the breaking strength of the material from which it is made. When employing narrower packing rings it will, therefore, also be possible in this case to impart to the carbon or graphite by the addition of appropriate metallic substances, such as copper or the like, a coefficient of expansion which will approximately correspond to that of the shaft. When employing the known key-ring packings, where the packing units had to possess a considerably greater width, because always two packing rings were required for that purpose in each chamber, such rings consisting of a combination of graphite and metal would have loaded the shaft excessively, or else it would have required an excessively powerful spring in order to avoid a loading of the shaft by them and to press them against the side walls of the packing chamber. The employment of so-called pipe- or screw-springs would have been quite impossible in this case, because springs of this nature yield too easily. In the construction in accordance with the present invention, however, ordinary pipe- or screw-springs may be employed instead of the wave springs described hereinbefore or of other known wave springs.

Instead of providing the inner face of the thrust collar with an annular rib intended to engage an annular groove on the outer face of the packing ring, it will also be sufficient, in certain circumstances, to provide separate projections at certain intervals on the inner face of the thrust collar and to cause these projections to engage corresponding depressions on the outer face of the packing ring. It will always only be essential in this conection to render impossible thereby a lateral slipping away of the packing rings when mounting them.

Having now particularly described and ascertained the nature of my said invention, I declare that what I claim is:—

1. A carbon or graphite ring packing for the shafts of turbines and the like, which packing units, wherein every packing ring is pressed against a side wall of the packing chamber under wedge action, each packing unit comprising a carbon packing ring with oblique or tapered outer ring surface, a comparatively thin metal ring loosely encircling said carbon packing ring and being provided with a correspondingly oblique or tapered smooth inner face, said thin metal ring merely acting as a thrust collar, said thin metal ring or thrust collar being somewhat narrower than said carbon packing ring, an annular rib on the inner face of said thin metal ring or thrust collar, an annular groove in the outer face of said carbon packing ring, said annular rib being smaller than the width of said annular groove in said carbon packing ring, said annular rib engaging said annular groove, and a spring loosely encircling said metal ring, the bevel of both said rings being arranged in such direction that said carbon packing ring will be forced against that side wall of the packing chamber against which it will also be pressed by the motive medium of the turbine or the like.

2. A carbon or graphite ring packing for the shafts of turbines and the like, with packing units, wherein every packing ring is pressed against a side wall of the packing chamber under wedge action, each packing unit comprising a carbon packing ring with oblique or tapered outer ring encircling said carbon packing ring and being provided with a correspondingly oblique or tapered smooth inner face, said thin metal ring merely acting as a thrust collar, said thin metal ring or thrust collar being somewhat narrower than said carbon packing ring, an annular rib on the inner face of said thin metal ring or thrust collar, an annular groove in the outer face of said carbon packing ring, said annular rib being smaller than the width of said annular groove in said carbon packing ring, said annular rib engaging said annular groove, projections on the outer face of said thin metal ring or thrust collar, and a spring element loosely encircling said thrust collar, said spring element being arranged on said outer projections of said thrust collar, said spring element consisting of a wave-spring and an inelastic wire connected with said wave-spring and surrounding it, the bevel of both said rings being arranged in such direction that said carbon packing ring will be forced against that side wall of the packing chamber against which it will also be pressed by the motive medium of the turbine or the like.

3. A carbon or graphite ring packing for the shafts of turbines and the like, with packing units, wherein every packing ring is pressed against a side wall of the packing chamber under wedge action, each packing unit comprising a carbon packing ring with oblique or tapered outer ring surface, a comparatively thin metal ring encircling said carbon packing ring and being provided with a correspondingly oblique or tapered inner face, said thin metal ring merely acting as a thrust collar, projections on the outer face of said thin metal ring or thrust collar, and a spring element encircling said thrust collar, said spring element being arranged on said outer projections of said thrust collar, said spring element consisting of a wave-spring and an inelastic wire connected with said wave-spring and surrounding it, one end of said inelastic wire being bifurcated the two branches of said bifurcated end being connected to the fastening part of one end of said wave spring, the other end of said inelastic wire passing along between said two branches of said bifurcated end, said other end of said wire being detachably and adjustably connected with the second end of said wave-spring, the bevel of both said rings being arranged in such direction that said carbon packing ring will be forced against that side wall of the packing chamber against which it will also be pressed by the motive medium of the turbine or the like.

4. A carbon or graphite ring packing for the shafts of turbines and the like, with packing units, wherein every packing ring is pressed against a side wall of the packing chamber under wedge action, each packing unit comprising a carbon packing ring with oblique or tapered outer ring surface, said carbon packing ring being composed of several segments, a comparatively thin metal ring encircling said carbon packing ring and having a correspondingly oblique or tapered flat surface, said thin metal ring also being composed of several segments, the segments of said thin metal ring covering the radial gaps between the segments of said carbon packing ring, said thin metal ring being somewhat narrower than said carbon packing ring, an annular rib on the inner face of said thin metal ring or thrust collar, an annular groove in the outer face of said carbon packing ring, said annular rib being smaller than the width of said annular groove in said carbon packing ring, said annular rib engaging said annular groove, and a spring loosely encircling said metal ring, the bevel of both said rings being arranged in such direction that said carbon packing ring will be forced against that side wall of the packing chamber against which it will also be pressed by the motive medium of the turbine or the like.

GUSTAV HUHN.